No. 879,975. PATENTED FEB. 25, 1908.
C. T. MILLER & G. A. CARLSON.
BALE BINDING ATTACHMENT FOR HAY PRESSES
APPLICATION FILED JUNE 17, 1907.
4 SHEETS—SHEET 4.
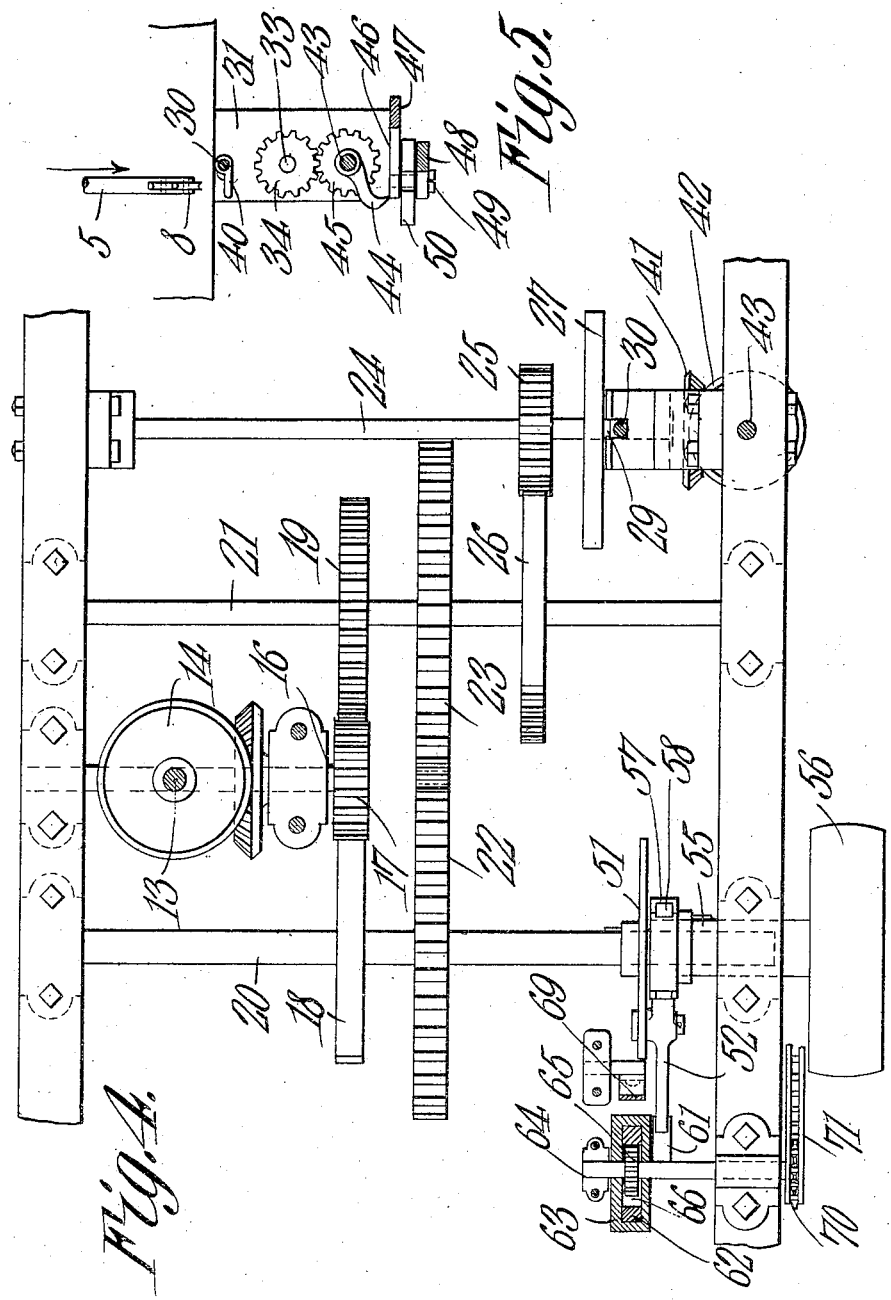
WITNESSES:
Clarence T. Miller
George A. Carlson INVENTORS
By C. A. Snow & Co.
ATTORNEYS

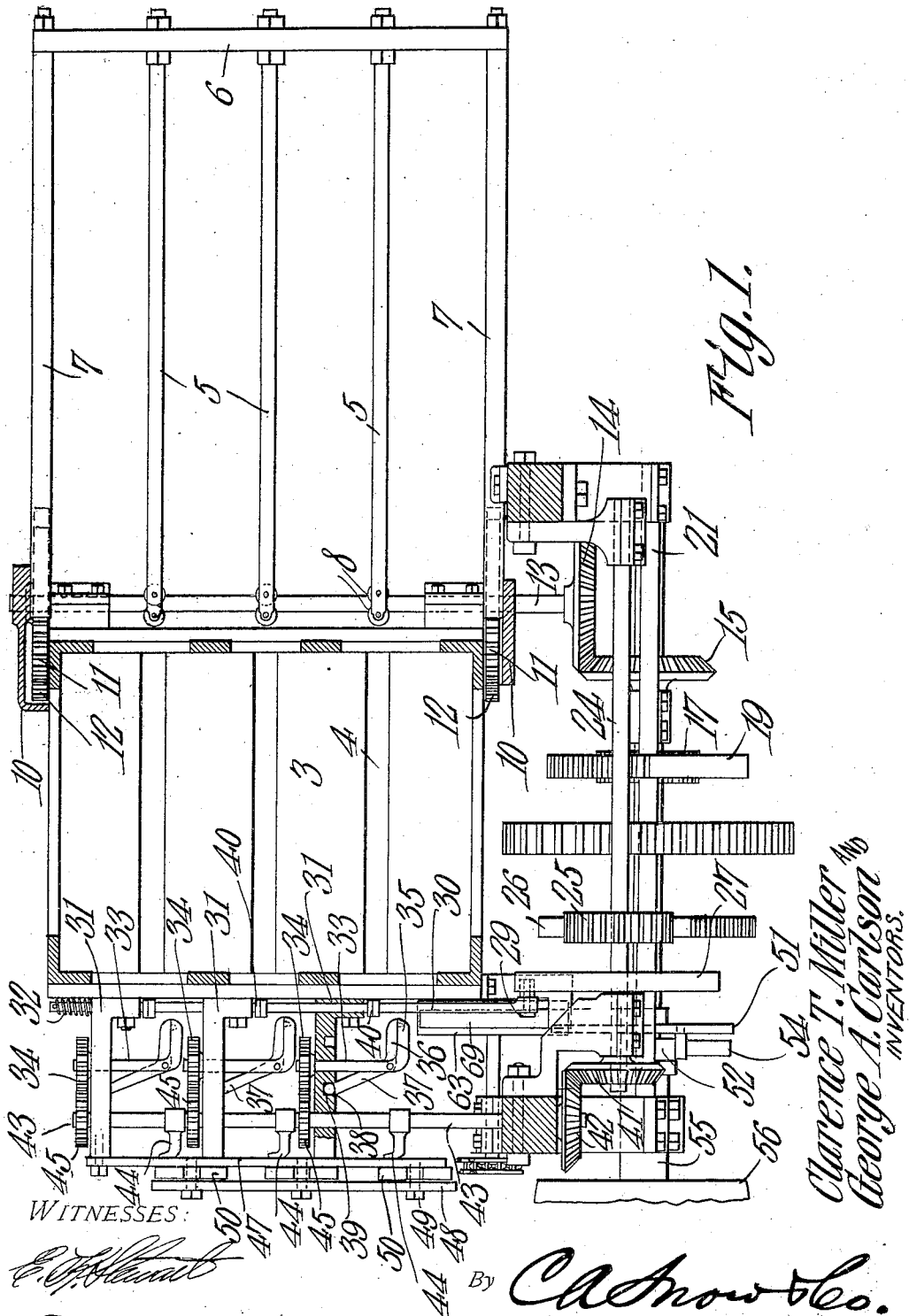

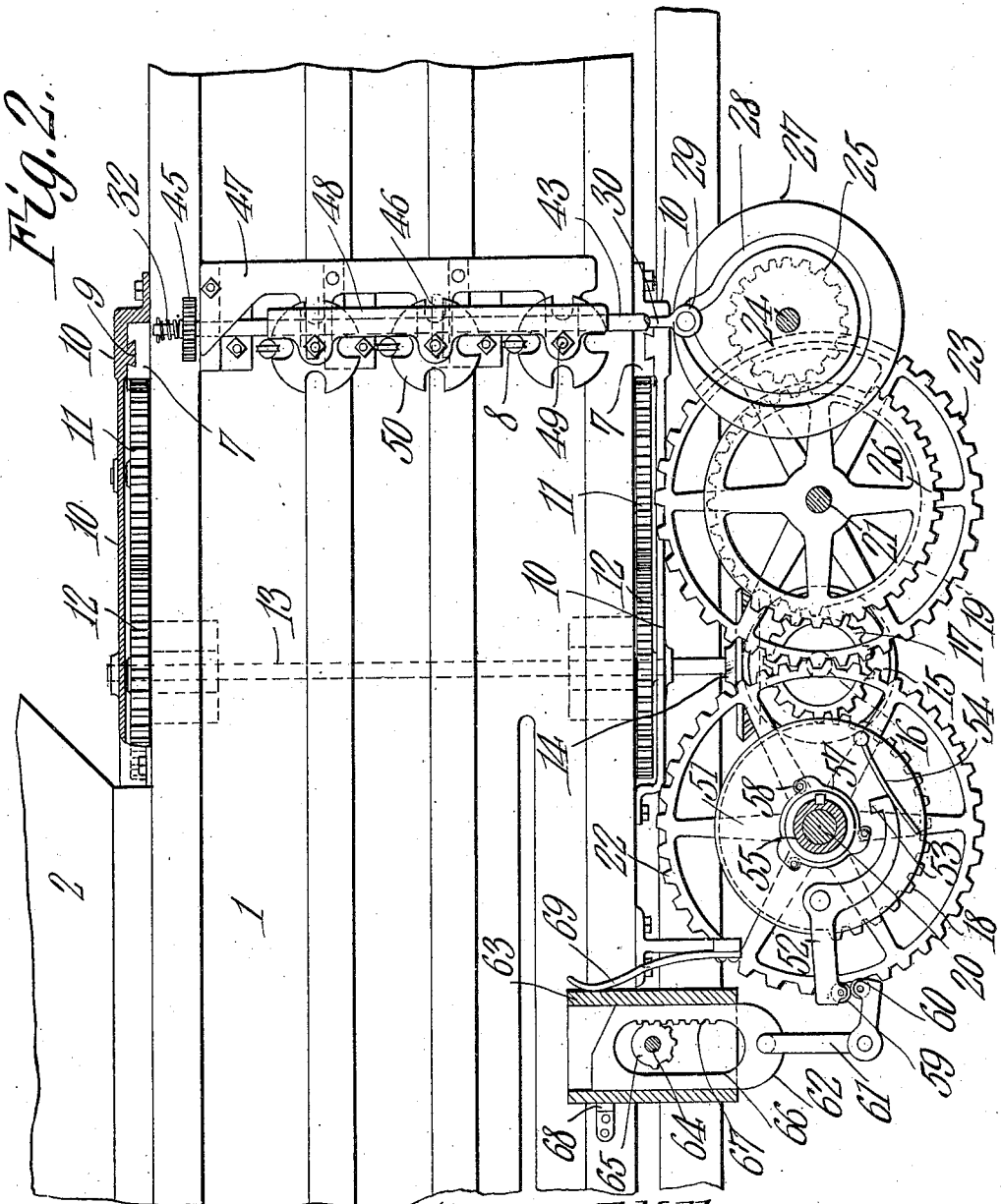

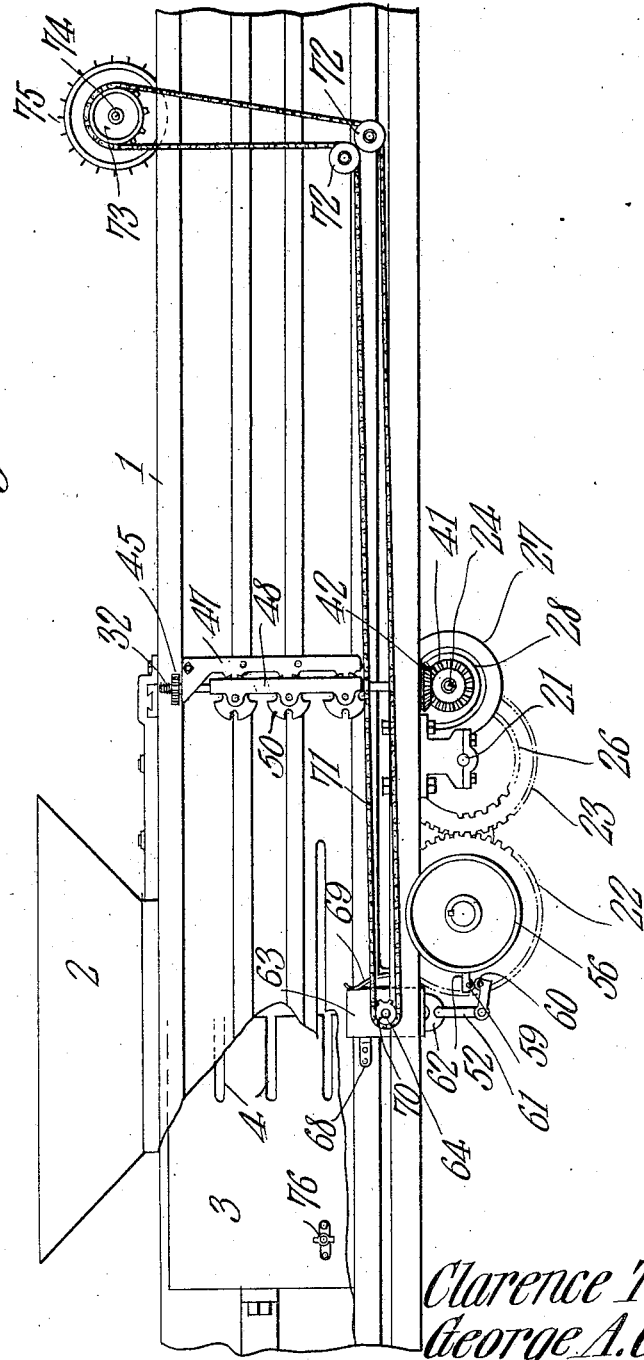

UNITED STATES PATENT OFFICE.

CLARENCE T. MILLER AND GEORGE A. CARLSON, OF MOSCOW, IDAHO.

BALE-BINDING ATTACHMENT FOR HAY-PRESSES.

No. 879,975.      Specification of Letters Patent.      Patented Feb. 25, 1908.

Application filed June 17, 1907. Serial No. 379,462.

*To all whom it may concern:*

Be it known that we, CLARENCE T. MILLER and GEORGE A. CARLSON, citizens of the United States, residing at Moscow, in the county of Latah and State of Idaho, have invented a new and useful Bale-Binding Attachment for Hay-Presses, of which the following is a specification.

This invention has reference to improvements in bale-binding attachments for hay presses, and its object is to provide means for applying wire bands to the bale and for securing the ends of the wires together, all as a continuous, automatic operation.

The invention comprises essentially a series of wire-carrying devices arranged to carry the wires across the bale on the plunger side thereof and to properly secure the ends of the wires encircling the bale, and at the same time, on the return movement of these devices, to leave fresh strands of wire which will be engaged by the oncoming hay and will be carried away from the plunger side of the bale so as to encircle the same, with one end of the wire securely held and the other end again carried across the plunger side of the bale to be again secured to the first end.

The invention comprises the various means for performing the operations described and will be fully understood from the following detailed description, taken in connection with the accompanying drawings, forming part of this specification, in which,—

Figure 1 is a section through a baling chamber showing the means employed for applying the wire bands to the bale; Fig. 2 is an elevation of the press, with parts in section, taken from the knotter side of the press; Fig. 3 is an elevation similar to that shown in Fig. 2, with parts broken away and showing a more extended view of the press to illustrate certain parts not shown in Fig. 2; Fig. 4 is a plan view, partly in section, of the driving gear; and Fig. 5 is a detail view.

Referring to the drawings, there is shown a portion 1 of a hay baling press, including the feed hopper 2 and the plunger 3, all of which may be of the ordinary type. The plunger 3 is provided on its face with deep, narrow recesses 4 extending laterally across the face and appropriately located and spaced in conformity with the number and location of the wire bands for the bale.

On one side of the baling chamber at points coincident with the recesses 4 in the plunger when the said plunger is at the forward limit of its travel, are a number of spaced bars 5 which, for convenience, may be termed needle bars. These bars are each mounted at one end in a cross-bar 6, in the ends of which latter are other bars 7 parallel with the needle bars 5 and so spaced as to straddle the top and bottom of the baling press frame. Each needle bar at its free end carries two rollers 8, the function of which will presently appear. One side of each bar 7 is formed with rack teeth and the bar itself has an undercut groove in which fits a suitable tongue 9 formed on a bracket 10 fast on the top and bottom of the baling press. Connected with each bar 7, which latter may be termed rack bars, there is a gear wheel 11 driven by another gear wheel 12 on a shaft 13 extending from top to bottom of the machine and beyond the latter, where it carries a bevel pinion 14 to be hereinafter referred to. It will be understood that there is a gear wheel 12 and an idler 11 and a rack bar 7 at both the top and the bottom of the machine. The shaft 13 and the idler 11 are each journaled in a suitable extension of the bracket 10, which may also be so shaped as to inclose the idler gear 11 and the gear 12 on the shaft 13. The bevel pinion 14 is in mesh with another bevel pinion 15 upon a shaft 16 extending transversely of the machine beneath the baling chamber. This shaft 16 is suitably journaled and carries at one end a gear pinion 17. On opposite sides of the pinion 17 there are mutilated gear wheels 18 and 19, both arranged to mesh with the pinion 17 in proper time sequence. These mutilated gear wheels 18 and 19 are mounted upon respective shafts 20 and 21 journaled in suitable bearings beneath the compression chamber and are connected for rotation in opposite directions by means of two meshing gear wheels 22 and 23 fast upon the respective shafts 20 and 21. The construction is such and the mutilated gears 18 and 19 are so located that upon the rotation of the shaft 20 which, as will hereinafter appear, constitutes the drive shaft of the machine, the shaft 21 will be rotated in the opposite direction and the mutilated gears 18 and 19 will alternately engage the pinion 17 and cause the latter to rotate alternately in opposite directions for a distance depending upon the relative number of teeth in the mutilated gears 18 and 19, the latter being of the same size and having the same number of teeth. The alternate rotation of the pinion 17 will, through the bevel pinions 14 and 15, the shaft 13 and the connections therefrom to the racks 7, cause the needle bars 5 to enter and pass through the recesses or channels formed across the face of the plunger 3 and to be then withdrawn therefrom. To one side of and parallel with the shaft 21 there is another shaft 24 suitably journaled in the framework of the machine, and this shaft carries a pinion 25 in the path of a mutilated gear wheel 26 mounted upon the shaft 21. This mutilated gear 26 will cause the shaft 24 to rotate intermittently but always in the same direction.

Mounted upon the shaft 24 there is a disk 27 having in one face a cam groove 28 in which engages a roller 29 on the lower end of a bar 30, which bar extends upward alongside of the baling chamber at a point opposite the needle bars 5 and to one side of the path thereof. This bar 30 is guided in a set of brackets 31 and extends above the uppermost bracket where it is surrounded by a spring 32 which tends to constantly elevate this bar. Journaled in each bracket 31 is the upper end of a short vertical shaft 33 carrying above the bracket 2 pinion 34, and below the same this shaft 33 is formed into a jaw 35 extending in a horizontal plane from said shaft 33. Pivoted to the shaft 33 is another jaw 36 matching the jaw 35 and having an arm 37 extending from the pivot point in a direction upward toward the under side of the corresponding bracket 31 where it is provided with a ball-end 38 engaging in a groove 39. The two jaws 35 and 36 are located below the plane of travel of the needle bars 5 and, as will hereinafter appear, this structure constitutes the knotter. The groove 39 is suitably shaped to open and close the jaws at the proper time. The bar 30 carries an appropriate number of fingers 40 (see Fig. 5) which, as will hereinafter appear, serve to direct the wires carried by the needle bars into the path of the knotters.

Returning once more to the shaft 24, it will be seen that this shaft carries beyond the cam disk 27 a bevel pinion 41 in mesh with another bevel pinion 42 on the lower end of an upright shaft 43. This shaft carries a number of shearing blades 44, to be hereinafter referred to, and coincident with the pinions 34 the shaft 43 carries other pinions 45 in mesh with the respective pinions 34. It will be seen from this that when the shaft 43 is rotated in one direction the knotters are rotated in the other direction. Each shearing blade 44 is constructed to move through a slot 46 in a bar 47 fast on the outer ends of the brackets 31, and exterior to this bar 47 there is another upright bar 48 spaced from and secured to the bar 47 by bolts 49, which latter carry radially slotted wheels 50.

Now, let it be supposed that it is desired to form bales of hay bound with wire bands. First, there are led strands of wire from suitable spools, which are not shown, through the rollers 8 on the corresponding ends of the needle bars 5 and through the recesses 4 in the plunger 3 and the ends of these wires are then caught between the wheels 50 and the bar 47. The hay is now introduced through the hopper 2 into the baling chamber and the plunger is brought forward to compress the bale, at the same time pushing the wires along with it, these wires slipping through the rollers 8 and unwinding from the supply. When the bale has reached its proper dimensions the needle bars 5 are projected through the presser-head 3, each carrying with it a double strand of wire, one portion of which encircles the bale and the other of which comes from the supply. When the needle bars have reached their forward limit of movement the bar 30 is moved downward and the fingers 40 catch the respective strands and carry them downward until caught by the jaws 35 and 36 of the knotter. The ends of the wires which are held between the wheels 50 and the bar 47 and the ends of the wires which have just been moved across the pressure side of the bale are twisted together by the knotters, while at the same time the shearing blades 44 also catch the new ends of the wires and carry them into engagement with the wheels 50, so that the wires are caught between the wheels 50 and the bar 47 and there firmly clamped, the said shearing blades also serving to turn these wheels. The shearing blades are sufficiently long to engage the slots in the wheels 50 as the shearing blades are rotated with the shaft 43, and so turn said wheels an appropriate distance. At the same time the shearing blades, engaging the edges of the slots 46 in the bar 47, shear off the wires leaving the ends caught by the knotter free while the ends still engaged by the needle bars 5 remain clamped between the wheels or disks 50 and the bar 47. By this time the knotters have completed their revolution and have caused the ends of the wires to be twisted together in such manner as to tie the bands firmly around the bale, while on the retraction of the needle bars 5 the wire strands are left ready to be engaged by the next succeeding bale, and the operation is repeated automatically so long as desired. It will be understood, of course, that the various driving gears are properly timed to perform these several operations.

Mounted upon the shaft 20 there is a disk 51 carrying a bell-crank lever 52, one end of which terminates in a tooth 53 and is under the action of a spring 54 fast on the disk 51.

Mounted on the end of the shaft 20 there is a sleeve 55 extending through suitable bearings in the frame of the machine and carrying at its other end a drive pulley 56 receiving power from any suitable source. This sleeve carries at the end adjacent to the disk 51 a toothed member 57, having bearing rollers 58 in the teeth, and these teeth are arranged to be engaged by the tooth 53 on the lever 52. The other end of the lever 52 extends radially outward from the disk 51 and is there provided with a roller 59, which latter is arranged to be engaged by another roller 60 on an angle arm 61 fast on the lower end of a frame 62, said frame being mounted in a suitable guide 63 within which it may move longitudinally. The guide 63 is pivotally secured upon a shaft 64, properly journaled in the framework of the machine and having a mutilated pinion 65 housed in a slot 66 formed in the frame 62 and arranged to mesh at intervals with gear teeth 67 formed on one side of the frame 62 and projecting into the slot 66. The guide 63 is held in one position by a stop 68 and opposite the same is a spring 69 against which the guide must move when rocked on the shaft 64. This last-named shaft 64 carries at an appropriate point a sprocket pinion 70 engaged by a sprocket chain 71 which, as shown in Fig. 3, passes under two guide rollers 72 and up one side of the baling chamber over a sprocket wheel 73 on a shaft 74, which shaft also carries a spur-wheel 75 so located as to be engaged by the bales of hay as they pass through the baling chamber after having been bound.

Ordinarily the arm 61 is in the path of the bell-crank lever 52 so that the latter is moved against the spring 54 out of the path of the toothed member 57 in order that the driving pulley 56 may continue to rotate without affecting the rest of the machinery. Now, however, when the plunger 3 is moved to compress the hay, a stop 76 thereon engages the frame 62, which at this time is elevated by the movement of the spur-wheel 75 acting through the sprocket chain 71. This movement occurs when the bale is compressed so that the driving mechanism for the needle bars and knotters is set in motion and the bale is bound as before described. When the plunger 3 is retracted, the arm 61 comes again in the path of the bell-crank lever 52 and the shaft 20 is uncoupled from the driving pulley 56.

We claim:—

1. In a bale-binding attachment for hay presses, a series of needle bars movable across the baling chamber, knotters for tying the ends of the bale bands, cutters arranged to engage the wire strands carried by the needle bars, and clamp disks coacting with and moved by said cutters for holding the severed ends of the wire strands coming from the wire supply.

2. In a bale-binding attachment for hay presses, a series of reciprocatory needle bars for carrying wire strands across the baling chamber and knotters coacting therewith and consisting of a rotatable shaft terminating in a clamp jaw, a closing jaw pivoted to the shaft, and a guiding member for said second jaw timed to open and close the same to receive and tie and release the wires.

3. In a bale-binding attachment for hay presses, reciprocating needle bars for carrying the wire coming from a source of supply and movable across the baling chamber, and knotting mechanism at the limit of travel of the needle bars consisting of a series of rotatable shafts, each terminating in a jaw out of the path of the needle bars, another jaw pivoted to each shaft, means for operating said jaws, and a reciprocating bar having fingers arranged to engage wire strands carried by the needle bars and to move them into the path of the knotters.

4. In a bale-binding attachment for hay presses, a series of reciprocatory needle bars for carrying wire strands from a source of supply across the baling chamber, knotters out of the path of said needle bars, a movable bar having fingers engaging the wires carried by the needle bars and carrying them into the path of the knotters, shearing blades movable into the path of the wire strands, a stationary member coacting with the shearing blades to sever the wires, and clamps coacting with and operated by the shearing blades to hold the severed ends of the wire coming from the source of supply.

5. In a baling press, means for applying wire bands to the bales, means for propelling the wire-binding mechanism, and other means for timing the application of power to the wire-binding mechanism comprising a clutch member for coupling the power to the driving shaft, a toothed lever carried upon the drive shaft and a stop mechanism normally in the path of the toothed member to hold it out of engagement with the clutch mechanism and movable by the baling plunger to a position out of the path of the toothed member to permit the latter to engage the clutch member.

6. In a baling press, means for applying wire bands to the bales, means for propelling the wire-binding mechanism, and other means for timing the application of power to the wire-binding mechanism comprising a clutch member between the power element and the drive shaft, a toothed lever mounted on the drive shaft and movable into engagement with the clutch member, a pivoted frame carrying an arm normally in the path of the toothed member, connections under the control of the baled material passing through the press for controlling the relative position of the toothed member and the pivoted frame, and a stop on the press plunger arranged to engage the pivoted frame at the completion of the working stroke of the plunger to move the said frame out of engagement with the toothed member.

In testimony that we claim the foregoing as our own, we have hereto affixed our signatures in the presence of two witnesses.

CLARENCE T. MILLER.
GEORGE A. CARLSON.

Witnesses:
G. F. WALKER,
J. A. RAMSTEDT.